(12) United States Patent
Liu

(10) Patent No.: US 9,939,922 B2
(45) Date of Patent: Apr. 10, 2018

(54) INPUT METHOD OF CHINESE PINYIN AND TERMINAL

(71) Applicant: DONGGUAN GOLDEX COMMUNICATION TECHNOLOGY CO., LTD., Dongguan (CN)

(72) Inventor: Ran Liu, Dongguan (CN)

(73) Assignee: DONGGUAN GOLDEX COMMUNICATION TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 14/766,724

(22) PCT Filed: Jan. 13, 2014

(86) PCT No.: PCT/CN2014/070510
§ 371 (c)(1),
(2) Date: Aug. 7, 2015

(87) PCT Pub. No.: WO2014/190775
PCT Pub. Date: Dec. 4, 2014

(65) Prior Publication Data
US 2016/0085316 A1    Mar. 24, 2016

(30) Foreign Application Priority Data

May 31, 2013   (CN) .......................... 2013 1 0211535

(51) Int. Cl.
*G06T 11/00* (2006.01)
*G06F 3/023* (2006.01)
*G06F 3/01* (2006.01)

(52) U.S. Cl.
CPC ............ *G06F 3/0233* (2013.01); *G06F 3/018* (2013.01)

(58) Field of Classification Search
None
See application file for complete search history.

(56) References Cited

U.S. PATENT DOCUMENTS

2011/0171617 A1* 7/2011 Yeh .................. G06F 3/04886
434/157

FOREIGN PATENT DOCUMENTS

| CN | 1286421 A | 3/2001 |
|----|-----------|--------|
| CN | 1873589 A | 12/2006 |

(Continued)

*Primary Examiner* — Peter Hoang
(74) *Attorney, Agent, or Firm* — Shimokaji IP

(57) ABSTRACT

Embodiments of the present invention discloses an input method of Chinese pinyin. The method comprises: obtaining an operation position and an operation duration of inputting a character through a character input platform; determining a combination of pinyin letters corresponding to the operation position according to mapping relationships between operation positions of the character input platform and character information; selecting a pinyin letter from the combination of pinyin letters corresponding to the operation position or selecting the combination of pinyin letters corresponding to the operation position as a character input through the character input platform according to mapping relationships between operation durations each corresponding to one of the operation positions of the character input platform and character information. The embodiments of the present invention further discloses a terminal.

15 Claims, 7 Drawing Sheets

(56) References Cited

FOREIGN PATENT DOCUMENTS

| CN | 101533267 A | 9/2009 |
|---|---|---|
| CN | 101930295 A | 12/2010 |
| CN | 102214005 A | 10/2011 |
| CN | 102508555 A | 6/2012 |
| CN | 102854996 A | 1/2013 |

* cited by examiner

INPUT METHOD OF CHINESE PINYIN AND TERMINAL

CROSS REFERENCE TO RELATED APPLICATIONS

This application is a continuing application of PCT Patent Application No. PCT/CN2014/070510, entitled "CHINESE PINYIN ENTERING METHOD AND TERMINAL DEVICE", filed on Jan. 13, 2014, which claims priority to Chinese Patent Application No. 201310211535.9, filed on May 31, 2013, both of which are hereby incorporated in its entireties by reference.

FIELD OF THE TECHNICAL

The present invention relates to electronic technology field, and particularly to an input method of Chinese pinyin and a terminal.

BACKGROUND

With the popularity of smart phones, input methods adapted to different kinds of smart phones become more and more, such as Sogou input method, Baidu input method, and so on. In the existed input methods, input methods of Chinese characters mainly include stroke input, pinyin input, handwriting input, and so on. In the existed input methods of Chinese pinyin, with 26 Latin letters as the basis, letters of Chinese pinyin (the initial and the final) are typed according to the input method of a typical American keyboard layout (see FIG. 1) or T9 layout (see FIG. 2), then the input initial and final are combined to obtain a Chinese pinyin, to realize Chinese input.

In the existed technology, when a user uses the pinyin input method to input a Chinese character, the user needs to input a sequence of letters forming the Chinese pinyin one by one. For example, when the user wants to input a Chinese character expressed in pinyin "zhang", the user firstly needs to know the pinyin of the Chinese character is "zhang", and then sequentially clicks buttons corresponding to letters of "z", "h", "a", "n", and "g" to type every letter. For example, when the selected pinyin input mode is the mode of the American keyboard layout (see FIG. 1) mode, the user needs to sequentially click buttons corresponding to the letters of "z", "h", "a", "n", and "g" to type every letter to generate the pinyin "zhang". When the selected pinyin input mode is the mode of the T9 layout (see FIG. 2), the user needs to sequentially click buttons of 9-4-2-6-4 corresponding to the letters of "z", "h", "a", "n", and "g" to type every letter, and selects the pinyin "zhang" as the target pinyin (under the T9 mode, when the buttons of 9-4-2-6-4 are sequentially clicked, the pinyin output by default is "xiang").

As described above, it is known that for the pinyin input methods in the existed technology, there are a number of input steps of Chinese pinyin, operation is onerous, and the efficiency of typing Chinese pinyin is low.

SUMMARY

Embodiments of the present invention provides an input method of Chinese pinyin and a terminal, which can reduce steps of typing Chinese pinyin when inputting Chinese characters, increase the input speed of Chinese pinyin, increase the input efficiency of Chinese pinyin, and improve user's experience in using the terminal.

Embodiments of the present invention provides an input method of Chinese pinyin. The method comprises the following steps.

Obtaining an operation position and an operation duration of inputting a character through a character input platform.

Determining a combination of pinyin letters corresponding to the operation position according to mapping relationships between operation positions of the character input platform and character information.

Selecting a pinyin letter from the combination of pinyin letters corresponding to the operation position or selecting the combination of pinyin letters corresponding to the operation position as a character input through the character input platform according to mapping relationships between operation durations each corresponding to one of the operation positions of the character input platform and character information.

Embodiments of the present invention further provides a terminal. The terminal includes the following units.

An obtaining unit is configured to obtain an operation position and an operation duration of inputting a character through a character input platform;

A determining unit is configured to determine a combination of pinyin letters corresponding to the operation position according to mapping relationships between operation positions of the character input platform and character information;

An outputting unit is configured to select a pinyin letter from the combination of pinyin letters corresponding to the operation position or select the combination of pinyin letters corresponding to the operation position as a character input through the character input platform according to mapping relationships between operation durations each corresponding to one of the operation positions of the character input platform and the character information.

Embodiments of the present invention further provides a terminal. The terminal includes a storage unit storing a plurality of computer-readable program codes, and a processor electrically connected to the storage unit and configured to execute the plurality of computer-readable program codes to: obtain an operation position and an operation duration of inputting a character through a character input platform, determine a combination of pinyin letters corresponding to the operation position according to mapping relationships between operation positions of the character input platform and character information, and select a pinyin letter from the combination of pinyin letters corresponding to the operation position or selecting the combination of pinyin letters corresponding to the operation position as a character input through the character input platform according to mapping relationships between operation durations each corresponding to one of the operation positions of the character input platform and character information.

Embodiments of the present invention may obtain the operation position and the operation duration of inputting a character through the character input platform, determine the combination of pinyin letter corresponding to the operation position of inputting a character according to the obtained operation position, and select a corresponding pinyin letter or combination of pinyin letters as the character input through the character input platform according to the operation duration of inputting a character. The embodiments of the present invention may reduce steps of typing Chinese pinyin when inputting Chinese characters, increase the input efficiency of Chinese pinyin, and improve user's experience in using the terminal to input characters.

BRIEF DESCRIPTION OF THE DRAWINGS

To better illustrate the technical solution of embodiments of the present invention, the following descriptions will briefly illustrate the accompanying drawings described in the embodiments. Obviously, the following described accompanying drawings are some embodiments of the present invention. Those skilled in the art can obtain other accompanying drawings according to the described accompanying drawings without creative work.

DETAILED DESCRIPTION OF ILLUSTRATED EMBODIMENTS

The technical solution of embodiments of the present invention will be described clearly and completely in combination with the accompanying drawings of the embodiments of the present invention. Obviously, the described embodiments are a part of embodiments of the present invention, and not all of the embodiments. According to the embodiments of the present invention, other embodiments obtained by those skilled in the art without creative work all fall within the protection scope of the present invention.

The terminal described in the embodiments of the present invention may be a mobile phone, a tablet PC, a laptop, a digital camera, a digital video camera, or other device. The above-mentioned terminals are just examples, not all of terminals are listed, and the terminal in the embodiments of the present invention may be, without limitation, one of the above-mentioned terminals.

Figure 1:
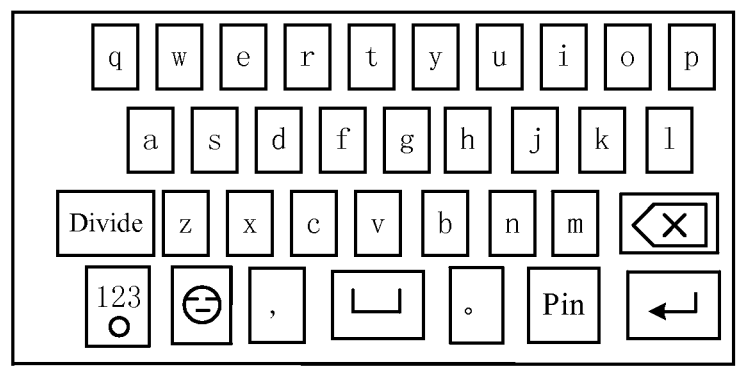
FIG. 1 is a schematic view of a keyboard layout of an input keyboard of an input method of Chinese pinyin in the existed technology.
Figure 2:
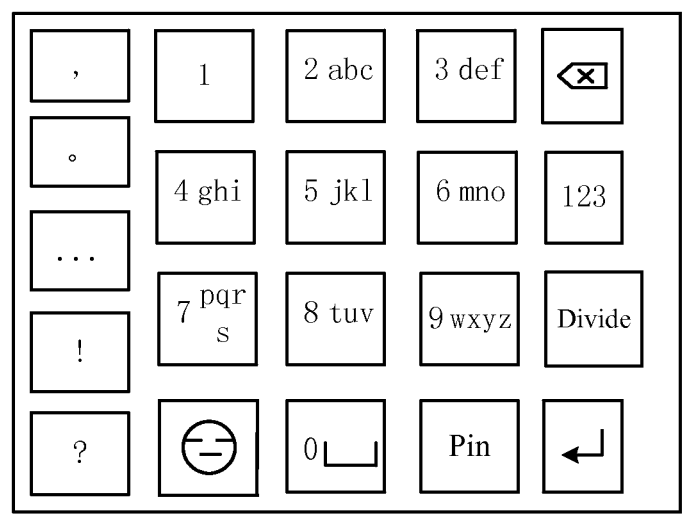
FIG. 2 is a schematic view of another keyboard layout of an input keyboard of an input method of Chinese pinyin in the existed technology.
Figure 3:
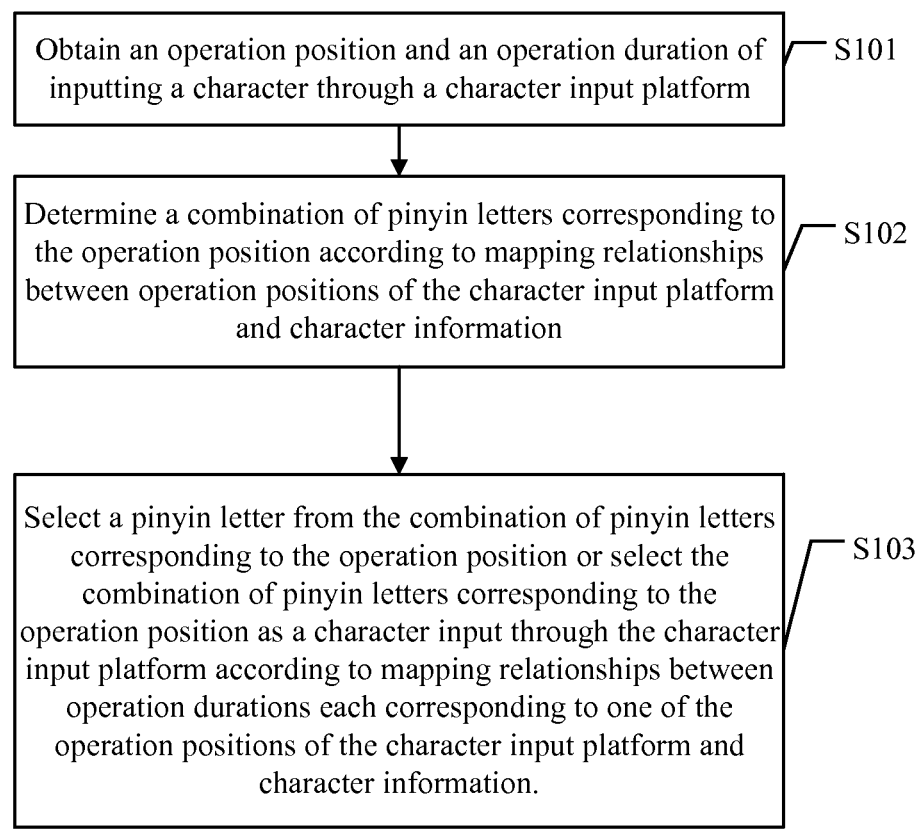
FIG. 3 is a flowchart of an input method of Chinese pinyin provided by a first embodiment of the present invention.

Referring to FIG. 3, a flowchart of an input method of Chinese pinyin provided by a first embodiment of the present invention is shown. The method includes the following steps.

Step S101, obtaining an operation position and an operation duration of inputting a character through a character input platform.

In detail, the character input platform may be a physical keyboard of character input, a soft keyboard of character input, or other keyboard. The above-mentioned character input platforms are just examples, not all of character input platforms are listed, and the character input platform in this embodiment may be, without limitation, one of the above-mentioned character input platforms. The character described above may be a pinyin letter, a Chinese punctuation, an Arabic numeral, or other character. In this embodiment, pinyin letters are used as examples to describe a pinyin input method more adapted for Chinese input. In addition, in this embodiment, the operation exerted on the character input platform may be clicking, tapping, pressing, sliding, or other action. The above-described actions are just examples, not all of actions are listed, and the action in this embodiment may be, without limitation, one of the above-described actions. Tapping will be used as an example to specially illustrate the input method of Chinese pinyin described in this embodiment.

Chinese is also known as Chinese characters, and is a way to represent Hanyu texts. Input methods of Chinese mainly include a stroke input method and a pinyin input method. For Chinese pinyin, a syllable is formed by rapidly and successively combining the initial and the final, together by adding a tone. The embodiment of the present invention provides a novel input method of Chinese pinyin according to characters of Chinese pinyin, together with the structure characters of the initials and the finals of Chinese pinyin as the basis. The structure of Chinese pinyin will be firstly illustrated to better and specially describe the input method of Chinese pinyin provided by the embodiment of the present invention.

Chinese pinyin is mainly consisted of the initials and the finals, wherein, there are 23 initials (the initials in Table 1), and 24 finals. Wherein, the 24 finals include simple finals (the simple finals in Table 2), compound finals (the compound finals in Table 3), a special vowel (the special vowel in Table 4), front nasal finals (the front nasal finals in Table 5), and back nasal finals (the back nasal finals in Table 6). pinyin letters described in the embodiment of the present invention include Latin letters of "a", "b", "c", "d", . . . , "z", and so on. Combinations of pinyin letters described in the embodiment of the present invention include the initials of "zh", "chi", "sh", and front nasal finals, and so on.

TABLE 1

| b | bo | p | po | m | mo | f | fo |
| d | de | t | te | n | ne | l | le |
| g | ge | k | ke | h | he | j | ji |
| q | qi | x | xi | zh | zhi | ch | chi |
| sh | shi | r | ri | z | zi | c | ci |
| s | si | y | yi | w | wu | | |

TABLE 2

| a | a | o | o | e | e | i | yi |
| u | wu | ü | yu | | | | |

TABLE 3

| ai | ai | ei | ei | ui | wei | ao | ao |
| ou | ou | iu | you | ie | ye | üe | yue |

TABLE 4

| | er | | er | |

TABLE 5

| an | an | en | en | in | yin | un | wen |
| ün | yun | | | | | | |

TABLE 6

| ang | ang | eng | heng | ing | ying | ong | hong |
|-----|-----|-----|------|-----|------|-----|------|

In detail, before the terminal obtains the operation position and the operation duration of inputting a character through the character input platform, and before the terminal determines the corresponding input character according to the obtained operation position and operation duration, the input keyboard layout corresponding to the input method of Chinese pinyin described in this embodiment may be preset, and input rules each corresponding to one initial or final described in the above-mentioned tables may be preset, that is, mapping relationships between operation positions of the character input platform and character information may be preset. Specifically, a new layout of a Chinese input keyboard (see Table 7) may be obtained by dividing Chinese pinyin into the initials and the finals according to content constructed by the pinyin letters described in the above-mentioned Tables 1-6, together with integrating the pinyin letters of Chinese pinyin.

TABLE 7

| A | O | E | I | U | V | Back nasal |
|---|---|---|---|---|---|------------|
| B | C | D | F | G | H | J |
| K | L | M | N | P | Q | R |
| S | T | W | X | Y | Z |   |

The input keyboard described in Table 7 is the character input platform corresponding to the input method of Chinese pinyin described in this embodiment. The input keyboard includes input buttons each corresponding to one of the Latin letters of "a", "b", "c", "d", . . . , "z" and a button corresponding to the back nasal.

In detail, after the layout of the input keyboard of Chinese pinyin is rearranged according to characters of the initials and the finals of Chinese pinyin, input rules of inputting Chinese pinyin may be set according to the layout of the input keyboard of Chinese pinyin. After the input buttons of the input keyboard of Chinese pinyin are set according to the above-described method, the pinyin letters or combinations of pinyin letters each corresponding to one input button may be set, that is, the initials or the simple finals each corresponding to one input button may be set, or combinations of pinyin letter each corresponding to one input button may be set, to set the mapping relationships between the operation positions of the character input platform and the character information. Wherein, the combinations of pinyin letters described above include the initials of "zh", "chi", "shi", the compound finals, the special vowel, the front nasal finals, the back nasal finals, and so on. The combinations of pinyin letters described in this embodiment mainly include the initials of "zh", "chi", "sh" and the front nasal finals. In detail, each input button may be set to correspond to one pinyin letter, or correspond to one combination of pinyin letters, or correspond to more combinations of pinyin letters. For example, the input keyboard of Chinese pinyin may be set to include 27 input buttons, and corresponding relationships between the input buttons and the pinyin letters are set to be the corresponding relationships of the layout shown in Table 7, that is, the first input button on the upper left corner of the input keyboard is the input button corresponding to the pinyin letter of "a". In detail, when the pinyin letters corresponding to the input keyboard are set, a same input button may be set to correspond to more pinyin letters. For example, for the input keyboard shown in Table 7, the first input button on the upper left corner of the input keyboard may be set to be the input button corresponding to the simple final of "a", and also set to be the input button corresponding to the front nasal final of "an", that is, the pinyin letter and the combination of pinyin letters corresponding to the input button are respectively the simple final of "a" and the front nasal final of "an".

In detail, after the pinyin letters or the combinations of pinyin letters each corresponding to one input button are set, in detail, if one input button is set to correspond to one combination of pinyin letters, the input duration corresponding to each pinyin letter of the combination of pinyin letters needs to be set, and the input duration corresponding to the combination of pinyin letters also needs to be set, that is, the operation duration of inputting each pinyin letter or the combination of pinyin letters needs to be set. When the character set to correspond to the input button is one combination of pinyin letters, the input duration corresponding to each pinyin letter of the combination of pinyin letters corresponding to the input button and the input duration corresponding to the combination of pinyin letters are also set while the combination of pinyin letters corresponding to the input button is set according to the above-described method, to set the mapping relationships between the operation durations each corresponding to one operation position of the character input platform and the character information. For example, if the combination of pinyin letters corresponding to the first input button on the upper left corner of the input keyboard shown in Table 7 is "an" (according to the operation duration of inputting a character the output may be "a" or the front nasal final "an"), the input duration corresponding to the pinyin letter "a" may be set to be T1, and the input duration corresponding to the combination of pinyin letters "an" may be set to be T2. After the input durations respectively corresponding to the pinyin letter and the combination of pinyin letters corresponding to the input button are set, whether the corresponding pinyin letter or combination of pinyin letters is selected as the input character may be determined according to the operation duration of inputting a character by the user.

Step 102, determining the combination of pinyin letters corresponding to the operation position according to the mapping relationships between the operation positions of the character input platform and the character information.

Step 103, selecting one pinyin letter from the combination of pinyin letters corresponding to the operation position or selecting the combination of the pinyin letters corresponding to the operation position as the character input through the character input platform, according to the mapping relationships between the operation durations each corresponding to one operation position of the character platform and the character information.

After the terminal sets the mapping relationships between the operation positions of the character input platform and the character information and sets the mapping relationships between the operation durations each corresponding to one operation position of the character input platform and the character information, the pinyin letter or combination of pinyin letters corresponding to the real-timely obtained operation position and operation duration of the user inputting a character through the character input platform may be determined according to the mapping relationships. In detail, when the user inputs a character through the character input keyboard (physical keyboard of character input or soft keyboard of character input), the terminal obtains the operation position of inputting a character through the character input platform by a built-in obtaining unit, that is, after the terminal obtains the tapping position of the user inputting a character, the pinyin letter or combination of pinyin letters corresponding to the tapping position may be determined according to the mapping relationships between the operation positions of the character input platform and the character information. For example, when the user inputs a character of a pinyin letter, if the tapping position is the first input button on the upper left corner of the input keyboard shown in Table 7, the combination of pinyin letters corresponding to the input button is determined to be "an" according to the mapping relationship between the input button and the pinyin letter or combination of pinyin letters, that is, the pinyin letter "a" or the combination of pinyin letters "an" may be output, and then whether the input button corresponds to the pinyin letter "a" or the combination of pinyin letters "an" is determined according to the operation duration of the user inputting the character through the input keyboard (that is by determining whether the duration of pressing the input button on the upper left corner of the input keyboard shown in Table 7 is T1 (e.g., a short pressing) or T2 (e.g., a long pressing, wherein T1 is less than T2)). If the duration of the user tapping the input button is T1, it is determined that the input character currently desired by the user is "a", and the pinyin letter "a" is selected as the character currently input through the character input platform. If the duration of the user tapping the input button is T2, it is determined that the input character currently desired by the user is "an", and the combination of pinyin letters "an" is selected as the character currently input through the character input platform.

In this embodiment, the operation position and operation duration of inputting a character through the character input platform (e.g., input keyboard) may be obtained, and the pinyin letter or combination of pinyin letters corresponding to the operation position of inputting the character may be determined according to obtained operation position. After determining that the obtained operation position corresponds to the combination of pinyin letters, whether the corresponding pinyin letter of the combination of pinyin letters or the combination of pinyin letters is selected as the character input through the character input platform is determined according to the operation duration of inputting the character. The embodiment of the present invention may reduce steps of typing Chinese pinyin when inputting Chinese characters, increasing the efficiency of inputting Chinese pinyin, and improving user's experience in using the terminal to input characters.

Figure 4:
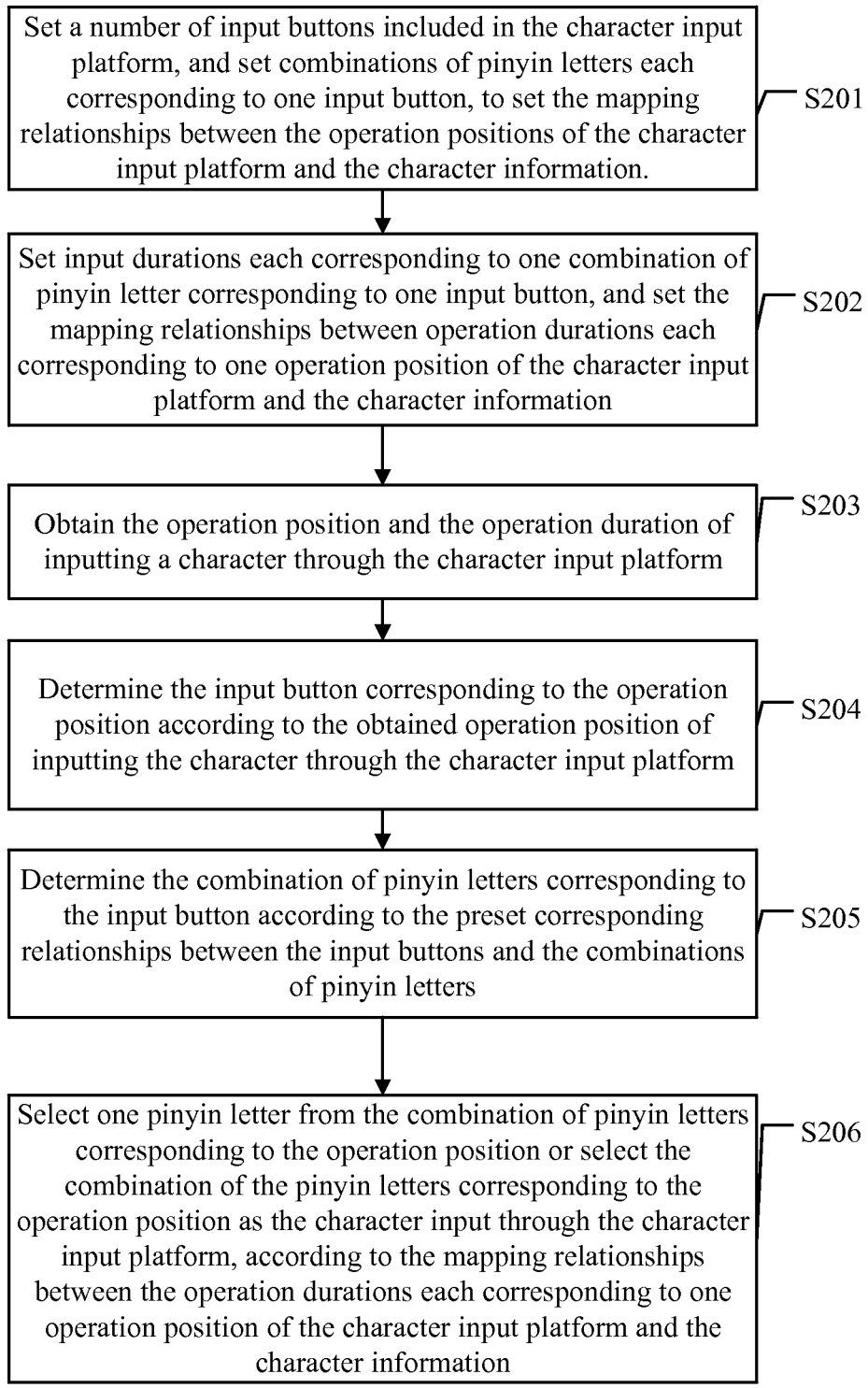
FIG. 4 is a flowchart of an input method of Chinese pinyin provided by a second embodiment of the present invention.

Referring to FIG. 4, a flowchart of an input method of Chinese pinyin provided by a second embodiment of the present invention is shown. The input method of Chinese pinyin in this embodiment includes the following steps.

Step S201, setting a number of input buttons included in the character input platform, and setting combinations of pinyin letters each corresponding to one input button, to set the mapping relationships between the operation positions of the character input platform and the character information.

Step S202, setting input durations each corresponding to one combination of pinyin letter corresponding to one input button, and setting the mapping relationships between operation durations each corresponding to one operation position of the character input platform and the character information.

In detail, before the terminal determines the corresponding input character according to the operation position and the operation duration of the user inputting a character through the character input platform, the layout of the input keyboard corresponding to the input method of Chinese pinyin described in this embodiment may be preset, and input rules each corresponding to one initial or final shown in the above-mentioned tables are set, that is, the mapping relationships between the operation positions of the character input platform and the character information are preset. Specifically, from the letters of Chinese pinyin shown in Tables 1-6 described in the first embodiment, it is known that the initials "z", "c", "a" of the 23 initials shown in Table 1 respectively have the mixing initials "zh", "ch", "sh", wherein, it may be understood that "zh" may be consisted of "z plus h", "ch" may be consisted of "c plus h", and "sh" may be consisted of "s plus h". The pinyin letters shown in each table described above include six simple finals, as shown in Table 2, wherein, "ü (yu)" is represented by "v" in existed input keyboards consisted of the Latin letters. In this embodiment "v" may be also used to represent the final "ü". In addition, the pinyin letters shown in each table described above include eight compound finals, as shown in Table 3, wherein, the compound final is consisted of two simple finals. The pinyin letters shown in each table described above further include a special vowel "er" consisted of "e plus r", five front nasal finals each consisted of one of the simple finals "a", "e", "i", "u", "v", and the simple final "n", and four back nasal finals each consisted of one of the simple finals "a", "e", "i", "o", and the simple finals "n" and "g".

As described above, the input keyboard of Chinese pinyin may be rearranged. Specifically, a new keyboard for inputting Chinese may be obtained by dividing Chinese pinyin into the initials and finals, together by integrating pinyin letters of Chinese pinyin. The new keyboard is shown in Table 8.

TABLE 8

| A | O | E | I | U | V | Back nasal |
|---|---|---|---|---|---|---|
| B | C | D | F | G | H | J |
| K | L | M | N | P | Q | R |
| S | T | W | X | Y | Z | |

As shown in Table 8, the character input platform may be set to include a number of input buttons used as the operation positions of inputting characters through the character input platform. Wherein, the character input platform may be a physical keyboard of character input, a soft keyboard of character input, or other keyboard. The above-mentioned input platforms are just examples, not all of input platforms are listed, and the input character platform in this embodiment may be, without limitation, one of the above-mentioned input platforms. As shown in Table 8, the input keyboard of Chinese pinyin includes 27 input buttons, wherein, the 27 input buttons include input buttons each corresponding to one of the letters of a, b, c, d, . . . , z and the button corresponding to the back nasal, and the input keyboard is used as tapping positions of inputting Chinese pinyin. Comparing the pinyin letters shown in Table 8 with the pinyin letters shown in Tables 1-6, it is known that the initials of "zh", "ch", "sh" shown in the initial table (Table 1) do not appear in the Table 8, and the finals shown in the final table (Tables 2-6) do not appear in the Table 8 except the simple finals shown in Table 2, and in Table 8 a character of back nasal is newly added. Therefore, if inputting all the initials and finals through the input buttons shown in Table 8 described above, it needs to define new rules for inputting characters, to provide a more simple input method of Chinese pinyin.

Specifically, after the input buttons of the input keyboard of Chinese pinyin are set according to the above-mentioned method, pinyin letters or combinations of pinyin letters each corresponding to one input button may be set, that is, each input button may be set to correspond to one initial or simple final or each input button may be set to correspond to one combination of pinyin letters each, to set the mapping relationships between the operation positions of the character input platform and the character information. Wherein, the combination of pinyin letters described above include the initials of "zh", "ch", "sh", compound finals, the special vowel, the front nasal finals, the back nasal finals, and so on. The combination of pinyin letters described in this embodiment mainly include the initials of "zh", "ch", "sh", and the front nasal finals. In detail, each input button may be set to correspond to one pinyin letter, or correspond to one combination of pinyin letters, or more combinations of pinyin letters. For example, the input keyboard of Chinese pinyin may be set to include 27 input buttons, and the corresponding relationships between the input buttons and the pinyin letters is set to be the corresponding relationships of the layout shown in Table 8, that is, the first input button on the upper left corner of the input keyboard may be set to be the input button corresponding to the pinyin letter "a". In detail, when the pinyin letters corresponding to the input keyboard are set, a same input button may be set to correspond to more pinyin letters. For example, for the input keyboard shown in Table 8, the first input button on the upper left corner of the input keyboard may be set to be the input button corresponding to the simple final "a", and the input button corresponding to the front nasal final "an", that is, the input button may correspond to the combination of pinyin letters "an". Whether the simple final "a" or the front nasal final "an" is output may be determined according to the operation duration of inputting a character.

In detail, since each input button of the input keyboard of Chinese pinyin may correspond to one pinyin letter, or may correspond to one combination of pinyin letters or more combinations of pinyin letters, when the character corresponding to the input button is one combination of pinyin letters, the input durations each corresponding to one pinyin letter of the combination of pinyin letters and the input duration corresponding to the combination of pinyin letters are set while the combination of pinyin letters corresponding to the input button is set according to the above-mentioned method, to set the mapping relationships between the operation durations each corresponding to one operation position of the character input platform and the character information. For example, if the pinyin letter and the combination of pinyin letters corresponding to the first input button on the upper left corner of the input keyboard shown in Table 8 are respectively "a" and the front nasal final "an", the input duration corresponding to the pinyin letter "a" may be set to be T1, and the input duration corresponding to the combination of pinyin letters "an" may be set to be T2. After the input duration corresponding to the pinyin letter and the input duration corresponding to the combination of pinyin letters are set, whether the corresponding pinyin letter or the combination of pinyin letters is selected as the input character may be determined according to the operation duration of the user inputting the character.

Input rules each corresponding to one of the pinyin letters of "z" and "zh", "c" and "ch", and "s" and "sh" may be set according to the above-described method. That is, when the user presses the input button corresponding to the pinyin letter "z" for a short time (the operation duration of inputting a character is T1), "z" is output as the corresponding input character, and when the user presses the input button corresponding to "z" for a long time (the operation duration of inputting a character is T2, and T2 is greater than T1), "zh" is output as the corresponding input character. Similarly, when the user presses the input button corresponding to the pinyin letter "c" for a short time, "c" is output as the corresponding input character, when the user presses the input button corresponding to "c" for a long time, "ch" is output as the corresponding input character, when the user presses the input button corresponding to the pinyin letter "s" for a short time, "s" is output as the corresponding input character, and when the user presses the input button corresponding to "s" for a long time, "sh" is output as the corresponding input character.

Input rules each corresponding to one of the front nasal finals (an, en, in, un, ün (also be vn)) may also be set according to the above-mentioned method. That is, when the user presses the input button corresponding to the simple final of one front nasal final for a long time, the corresponding front nasal final is input. For example, when the user presses the input button corresponding to the simple final "a" for a long time, the front nasal final "an" is output as the character input by the user. When the user presses the input button corresponding to the simple final "e" for a long time, the front nasal final "en" is output as the character input by the user. When the user presses the input button corresponding to the simple final "v" for a long time, the front nasal final "vn" is output as the character input by the user. For input rules each corresponding to one of the back nasal finals, it may be set that one back nasal final is input by inputting "the simple final plus the back nasal". That is, when the user wants to input one back nasal final, the user firstly presses the input button corresponding to the simple final for a short time, and then presses the input button corresponding to the back nasal for a short time. For example, when the user wants to input the back nasal final "ang", the user firstly presses the input button corresponding to the simple final "a" for a short time, and then presses the input button corresponding to the back nasal for a short time, to finish the input of the back nasal final "ang".

Step S203, obtaining the operation position and the operation duration of inputting a character through the character input platform.

Step S204, determining the input button corresponding to the operation position according to the obtained operation position of inputting the character through the character input platform.

Step S205, determining the combination of pinyin letters corresponding to the input button according to the preset corresponding relationships between the input buttons and the combinations of pinyin letters.

Step S206, selecting one pinyin letter from the combination of pinyin letters corresponding to the operation position or selecting the combination of the pinyin letters corresponding to the operation position as the character input through the character input platform, according to the mapping relationships between the operation durations each corresponding to one operation position of the character input platform and the character information.

After the terminal sets the mapping relationships between the operation positions of the input character platform and the character information and sets the mapping relationships between the operation durations each corresponding to one operation position of the input character platform and the character information, the pinyin letter or combination of pinyin letters corresponding to the real-timely obtained operation position and operation duration of the user inputting a character through the character input platform may be determined according to the mapping relationships. Specifically, when the user inputs a character through the character input keyboard (physical keyboard of character input or soft keyboard of character input), the terminal obtains the operation position of inputting a character through the character input platform by a built-in obtaining unit, that is, after the terminal obtains the tapping position of the user inputting the character, the input button corresponding to the operation position may be determined, and whether the pinyin letter or the combination of pinyin letters corresponds to the tapping position may be determined according to the mapping relationships between the operation positions of the character input platform and the character information. For example, when the user inputs a character of a pinyin letter, if the tapping position is the first input button on the upper left corner of the input keyboard shown in Table 8, the combination of pinyin letters corresponding to the input button is determined to be "an" according to the mapping relationship between the input button and the pinyin letter or combination of pinyin letters, that is, the pinyin letter "a" or the combination of pinyin letters "an" may be output. Whether the input button corresponds to the pinyin letter "a" or corresponds to the combination of pinyin letters "an" is determined according to the operation duration of the user inputting a character through the input keyboard (that is by determining whether the duration of pressing the input button on the upper left corner of the input keyboard as shown in Table 8 is T1 (e.g., a short press) or T2 (e.g., a long press, wherein T1 is less than T2)). If the duration of the user tapping on the input button is T1, it is determined that the input character currently desired by the user is "a", and the pinyin letter "a" is selected as the character currently input through the character input platform. If the duration of the user tapping on the input button is T2, it is determined that the input character currently desired by the user is "an", and the combination of pinyin letters "an" is selected as the character currently input through the character input platform.

As described above, according to the layout of the input keyboard and the input rules of the letters of Chinese pinyin set above, if the user wants to input the Chinese character expressed in pinyin "zhang", the structure of the pinyin "zhang" is considered to be the structure consisted of the initial and the final, that is, consisted of "zh plus ang". According to the pinyin structure "zh plus ang" of the pinyin "zhang" and the input rules set above, the user firstly presses the input button corresponding to the pinyin letter "z" of the input keyboard shown in Table 8 for a long time to obtain the initial "zh". Secondly, the user presses the input button corresponding to the pinyin letter "a" of the input keyboard shown in Table 8 for a short time to obtain the simple final "a". Finally, the user presses the input button corresponding to the back nasal of the input keyboard shown in Table 8 for a short time to obtain the back nasal final "ang" according to the simple final "a", thus the pinyin "zhang" is obtained. From the steps described above, it is known that there are only 3 steps to input the pinyin "zhang". Comparing with the quanpin input existed in the present technology, two steps are omitted, and the input speed of pinyin input increases.

In this embodiment, the mapping relationships between the operation positions of the character input platform and the character information and the mapping relationships between the operation durations each corresponding to one operation position of the character input platform and the character information may be preset, that is, each input button of the input keyboard may be preset to correspond to one pinyin letter or one combination of pinyin letters. The operation position and operation duration of inputting a character through the character input platform (e.g., input keyboard) may be obtained, and the pinyin letter or combination of pinyin letters corresponding to the operation position of inputting the character through the character input platform may be determined according to the obtained operation position. Whether the corresponding pinyin letter or the combination of pinyin letters is selected as the character input through the character input platform is determined according to the operation duration of inputting the character. The embodiment of the present invention may reduce steps of typing Chinese pinyin when inputting Chinese characters, increasing the efficiency of inputting Chinese pinyin, and improving user's experience in the terminal to input characters.

Figure 5:
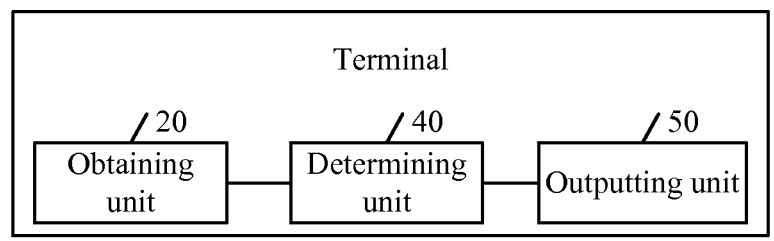
FIG. 5 is a schematic view of a structure of a terminal provided by a first embodiment of the present invention.

Referring to FIG. 5, a schematic view of a structure of a terminal provided by a first embodiment of the present invention is illustrated. The terminal described in this embodiment includes the following units.

An obtaining unit 20 is configured to obtain an operation position and an operation duration of inputting a character through the character input platform.

A determining unit 40 is configured to determine the combination of pinyin letters corresponding to the operation position according to the mapping relationships between the operation positions of the character input platform and the character information.

An outputting unit 50 is configured to select one pinyin letter from the combination of pinyin letters or select the combination of pinyin letters as the character input through the character input platform according to the mapping relationships between the operation durations each corresponding to one operation position of the character input platform and the character information.

In detail, before the terminal determines the corresponding input character according to the operation position and the operation duration of inputting a character through the character input platform, the terminal presets the layout of the input keyboard used by the user to input Chinese pinyin, and presets input rules each corresponding to one initial or final described in each table described above, that is, presets the mapping relationships between the operation positions of the character input platform and the character information. Specifically, a new layout of the Chinese input keyboard (see Table 9) may be obtained by dividing Chinese pinyin into the initials and the finals according to content constructed by the pinyin letters shown in Tables 1-6 described in the first embodiment of the input method of Chinese pinyin described above, together by integrating the pinyin letters of Chinese pinyin.

TABLE 9

| A | O | E | I | U | V | Back nasal |
|---|---|---|---|---|---|---|
| B | C | D | F | G | H | J |
| K | L | M | N | P | Q | R |
| S | T | W | X | Y | Z |   |

The input keyboard described in Table 9 is the character input platform of the terminal described in this embodiment, and may be a physical keyboard of character input, a soft keyboard of character, or other keyboard. The input keyboard includes input buttons each corresponding to one of the Latin letters of "a", "b", "c", "d", . . . , "z", and a button corresponding to the back nasal.

In detail, after the terminal rearranges the layout of the input keyboard of Chinese pinyin according to characters of the initials and the finals of Chinese pinyin, the terminal may set input rules of the user inputting Chinese pinyin according to the layout of the input keyboard of Chinese pinyin. After the terminal sets the input buttons of the input keyboard of Chinese pinyin according to the above-described method, the terminal may set pinyin letters or combinations of pinyin letters each corresponding to one input button, that is, may set that each input button corresponds to one initial or one simple final, or corresponds to one combination of pinyin letters, to set the mapping relationships between the operation positions of the character input platform and the character information. Wherein, the combinations of pinyin letters described above include the initials of "zh", "chi", "shi", the compound finals, the special vowel, the front nasal finals, the back nasal finals, and so on. The combinations of pinyin letters described in this embodiment mainly include the initials of "zh", "chi", "sh" and the front nasal finals. In detail, each input button may be set to correspond to one pinyin letter, or may be set to correspond to one combination of pinyin letters, or may be set to correspond to more combinations of pinyin letters. For example, the input keyboard of Chinese pinyin may be set to include 27 input buttons, and the corresponding relationships between the input buttons and the pinyin letters are set to be the corresponding relationships of the layout shown in Table 9, that is, the first input button on the upper left corner of the input keyboard is the input button corresponding to the pinyin letter of "a". In detail, when the pinyin letters corresponding to the input keyboard are set, a same input button may be set to correspond to more pinyin letters. For example, for the input keyboard shown in Table 9, the first input button on the upper left corner of the input keyboard may be set to be the input button corresponding to the simple final "a", and also set to be the input button corresponding to the front nasal final "an", that is, the pinyin letter and the combination of pinyin letters corresponding to the input button are respectively the simple final "a" and the front nasal final "an".

In detail, after the terminal sets the pinyin letters or the combinations of pinyin letters each corresponding to one input button, in detail, if one input button is set to correspond to one combination of pinyin letters, the input durations each corresponding to one pinyin letter of the combination of pinyin letters and the input duration corresponding to the combination of pinyin letters both need to be set, that is, the operation duration of inputting each pinyin letter or the combination of pinyin letters needs to be set. When the set character corresponding to the input button corresponds to one combination of pinyin letters, the input durations each corresponding to one pinyin letter of the combination of pinyin letters corresponding to the input button and the input duration corresponding to the combination of pinyin letters corresponding to the input button are also set while the combination of pinyin letters corresponding to the input button is set according to the above-described method, to set the mapping relationships between the operation durations each corresponding to one operation position of the character input platform and the character information. For example, if the combination of pinyin letters corresponding to the first input button on the upper left corner of the input keyboard shown in Table 9 is "an" (according to the operation duration of inputting the character the output may be "a" or the front nasal final of "an"), the input duration corresponding to the pinyin letter "a" may be set to be T1, and the input duration corresponding to the combination of pinyin letters "an" may be set to be T2. After the input duration corresponding to the pinyin letter corresponding to the input button and the input duration corresponding to the combination of pinyin letters corresponding to the input button are set, whether the corresponding pinyin letter or combination of pinyin letters is selected as the input character may be determined according to the operation duration of inputting the character by the user.

After the terminal sets the mapping relationships between the operation positions of the input character platform and the character information and sets the mapping relationship between the operation durations each corresponding to one operation position of the character input platform and the character information, the pinyin letter or combination of pinyin letters corresponding to the real-timely obtained operation position and operation duration of the user inputting a character through the character input platform may be determined according to the mapping relationships. Specifically, when the user inputs a character through the character input keyboard (physical keyboard of character input or soft keyboard of character input), the terminal obtains the operation position of inputting a character through the character input platform by the built-in obtaining unit 20, that is, after the terminal obtains the tapping position of the user inputting a character, the determining unit 40 determines the pinyin letter or the combination of pinyin letters corresponding to the tapping position according to the mapping relationships between the operation positions of the character input platform and the character information. For example, if the tapping position of the user inputting a character of a pinyin letter obtained by the obtaining unit 20 is the first input button on the upper left corner of the input keyboard shown in Table 9, the determining unit 40 determines that the combination of pinyin letters corresponding to the input button is "an" according to the mapping relationship between the input button and the pinyin letter or combination of pinyin letters, that is, the pinyin letter "a" or the combination of pinyin letters "an" may be output. The outputting unit 50 then determines whether the input button corresponds to the pinyin letter "a" or the combination of pinyin letters "an" according to the operation duration of the user inputting the character through the input keyboard (that is by determining whether the duration of pressing the input button on the upper left corner of the input keyboard shown in Table 9 is T1 (e.g., a short pressing) or T2 (e.g., a long pressing, wherein T1 is less than T2)). If the duration of the user tapping the input button is T1, it is determined that the input character currently desired by the user is "a", and the outputting unit 50 selects the pinyin letter "a" as the character currently input through the character input platform. If the duration of the user tapping the input button is T2, it is determined that the input character currently desired by the user is "an", and the outputting unit 50 selects the combination of pinyin letters "an" as the character currently input through the character input platform.

The terminal described in this embodiment, may obtain the operation position and the operation duration of inputting a character through the character input platform (e.g., the input keyboard) by the obtaining unit, and the determining unit determines the pinyin letter or the combination of pinyin letters corresponding to the operation position of inputting the character according to the operation position obtained by the obtaining unit. When the determining unit determines that the obtained operation position corresponds to the combination of pinyin letters, the outputting unit selects one corresponding pinyin letter from the combination of pinyin letters or selects the combination of pinyin letters as the character input through the character input platform according to the operation duration of inputting the character and outputs the character. The embodiment of the present invention may reduce steps of typing Chinese pinyin when inputting Chinese characters, increasing the efficiency of inputting Chinese pinyin, and improving user's experience in using the terminal to input characters.

Figure 6:
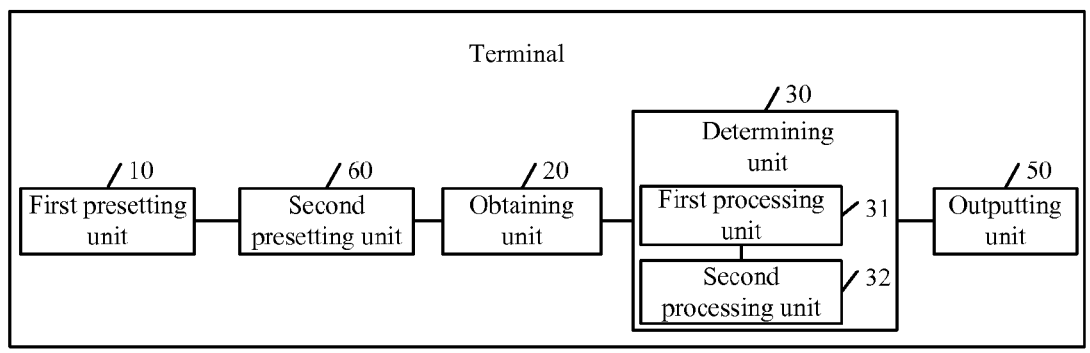
FIG. 6 is a schematic view of a structure of a terminal provided by a second embodiment of the present invention.

Referring to FIG. 6, a schematic view of a structure of a terminal provided by a second embodiment of the present invention is shown. The terminal includes the following units.

A first presetting unit 10 is configured to set that the character input platform includes a number of input buttons used as the operation positions of inputting characters through the character input platform, and set combinations of pinyin letters each corresponding to one input button, to set the mapping relationships between the operation positions of the character input platform and the character information.

A second presetting unit 60 is configured to set input durations each corresponding to one combination of pinyin letters corresponding to one input button, and set input durations each corresponding to one pinyin letter of one combination of pinyin letters, to set the mapping relationships between operation durations each corresponding to one operation position of the character input platform and character information.

An obtaining unit 20 is configured to obtain an operation position and an operation duration of inputting a character through the character input platform.

A determining unit 30 is configured to determine the combination of pinyin letters corresponding to the operation position according to the mapping relationships between the operation positions of the character input platform and the character information.

An outputting unit 50 is configured to select one pinyin letter from the combination of pinyin letters or select the combination of pinyin letters as the character input through the character input platform according to the mapping relationships between the operation durations each corresponding to one operation position of the character input platform and the character information.

Wherein, the determining unit 30 includes the following units.

A first processing unit 31 is configured to determine the input button corresponding to the operation position according to the obtained operation position of inputting a character through the character input platform.

A second processing unit 32 is configured to determine the combination of pinyin letters corresponding to the input button determined by the first processing unit 31 according to the preset corresponding relationships between the input buttons and the combinations of pinyin letters.

In detail, before the determining unit 30 of the terminal determines the corresponding input character according to the operation position and operation duration of the user inputting the character through the character input platform, the first presetting unit 10 sets the layout of the input keyboard of the terminal, and the second presetting unit 60 sets input rules each corresponding to one initial or one final shown in each table described above, that is, presets the mapping relationships between the operation positions of the character input platform and the character information. Specifically, from the letters of Chinese pinyin shown in Tables 1-6 described in the first embodiment, it is known that the initials "z", "c", "a" of the 23 initials shown in Table 1 respectively have the mixing initials "zh", "ch", "sh", wherein, it may be understood that "zh" is consisted of "z plus h", "ch" is consisted of "c plus h", and "sh" is consisted of "s plus h". The pinyin letters shown in each table described above include six simple finals, as shown in Table 2, wherein, "ü (yu)" is represented by "v" in existed input keyboards consisted of the Latin letters. In this embodiment "v" may be also used to represent the final "ü". In addition, the pinyin letters shown in each table described above include eight compound finals, as shown in Table 3, wherein, the compound final is consisted of two simple finals. The pinyin letters shown in each table described above further include the special vowel "er" consisted of "e plus r", five front nasal finals each consisted of one of the simple finals "a", "e", "i", "u", "v", and the simple final "n", and four back nasal finals each consisted of one of the simple finals "a", "e", "i", "o", and the simple finals "n" and "g".

As described above, the first presetting unit 10 may rearrange the input keyboard of Chinese pinyin. Specifically, the first presetting unit 10 may divide Chinese pinyin into the initials and finals, and integrate pinyin letters of Chinese pinyin to obtain a new layout of the Chinese input keyboard shown in Table 10.

TABLE 10

| A | O | E | I | U | V | Back nasal |
|---|---|---|---|---|---|---|
| B | C | D | F | G | H | J |
| K | L | M | N | P | Q | R |
| S | T | W | X | Y | Z |   |

As shown in Table 10, the first presetting unit 10 may set that the character input platform includes a number of input buttons used as the operation positions of inputting characters through the character input platform. Wherein, the character input platform may be a physical keyboard of character input, a soft keyboard of character input, or other keyboard. The above-mentioned input platforms are just examples, not all of input platforms are listed, and the input character platform in this embodiment may be, without limitation, one of the above-mentioned input platforms. As shown in Table 10, the first presetting unit 10 may sets that the input keyboard of Chinese pinyin includes 27 input buttons, wherein, the 27 input buttons include input buttons each corresponding to one of the letters of "a", "b", "c", "d", . . . , "z", and the button corresponding to the back nasal, and sets the input keyboard to be used as tapping positions of inputting Chinese pinyin. Comparing the pinyin letters shown in Table 10 with the pinyin letters shown in Tables 1-6, it is known that the initials of "zh", "ch", "sh" shown in the initial table (Table 1) do not appear in Table 10, and the finals shown in the final table (Tables 2-6) do not appear in Table 10 except the simple finals shown in Table 2, and in Table 10 a character of the back nasal is newly added. Therefore, if inputting all the initials and finals through the input buttons shown in Table 10 described above, it needs to redefine new rules of inputting characters, to provide a more simple input method of Chinese pinyin.

Specifically, after the first presetting unit 10 sets the input buttons of input keyboard of Chinese pinyin according to the above-mentioned method, the pinyin letters or combinations of pinyin letters each corresponding to one input button may be set, that is, the initials or simple finals each corresponding to one input button may be set, or combinations of pinyin letters each corresponding to one input button may be set, to set the mapping relationships between the operation positions of the character input platform and the character information. Wherein, the combination of pinyin letters described above include the initials of "zh", "ch", "sh", the compound finals, the special vowel, the front nasal finals, the back nasal finals, and so on. The combination of pinyin letters described in this embodiment mainly include the initials of "zh", "ch", "sh", and the front nasal finals. In detail, the first presetting unit 10 may set that each input button corresponds to one pinyin letter, or corresponds to one combination of pinyin letters, or corresponds to more combinations of pinyin letters. For example, the first presetting unit 10 may sets that the input keyboard of Chinese pinyin includes 27 input buttons, and set the corresponding relationships between the input buttons and the pinyin letters to be the corresponding relationships of the layout shown in Table 10, that is, set that the first input button on the upper left corner of the input keyboard to be the input button corresponding to the pinyin letter "a". In detail, when the first presetting unit 10 sets the pinyin letters corresponding to the input keyboard, a same button may be set to correspond to more pinyin letters. For example, for the input keyboard shown in Table 10, the first input button on the upper left corner of the input keyboard may be set to be the input button corresponding to the simple final "a", and may also set to be the input button corresponding to the front nasal final "an", that is, the input button may correspond to the combination of pinyin letters "an". Whether the simple final "a" or the front nasal final "an" is output is determined according to the operation duration of inputting the character.

In detail, since each input button of the input keyboard of Chinese pinyin may correspond to one pinyin letter, or may correspond to one combination of pinyin letters or more combinations of pinyin letters, when the character corresponding to one input button is one combination of pinyin letters, the second presetting unit 60 sets the input durations each corresponding to one pinyin letter of the combination of pinyin letters and the input duration corresponding to the combination of pinyin letters while the first presetting unit 10 sets the combination of pinyin letters corresponding to the input button according to the above-mentioned method, to set the mapping relationships between the operation duration each corresponding to one operation position of the character input platform and the character information. For example, if the pinyin letter and the combination of pinyin letters corresponding to the first input button on the upper left corner of the input keyboard shown in Table 10 are respectively "a" and the front nasal final "an", the second presetting unit 60 sets that the input duration corresponding to the pinyin letter "a" is T1, and sets that the input duration corresponding to the combination of pinyin letters "an" is T2. After the second presetting unit 60 sets the input duration corresponding to the pinyin letter and the input duration corresponding to the combination of pinyin letters, the outputting unit 50 determines to select the corresponding pinyin letter or the combination of pinyin letters as the input character according to the operation duration of the user inputting the character.

In addition, the second presetting unit 60 may sets input rules each corresponding to one of the pinyin letters of "z" and "zh", "c" and "ch", and "s" and "sh" according to the above-described method. That is, it may be set that when the user presses the input button corresponding to the pinyin letter "z" for a short time (the operation duration of inputting a character is T1), "z" is output as the corresponding input character, and when the user presses the input button corresponding to "z" for a long time (the operation duration of inputting a character is T2, and T2 is greater than T1), "zh" is output as the corresponding input character. Similarly, the second presetting unit 60 may sets that when the user presses the input button corresponding to the pinyin letter "c" for a short time, "c" is output as the corresponding input character, and when the user presses the input button corresponding to "c" for a long time, "ch" is output as the corresponding input character. When the user presses the input button corresponding to the pinyin letter "s" for a short time, "s" is output as the corresponding input character, and when the user presses the input button corresponding to "s" for a long time, "sh" is output as the corresponding input character.

Furthermore, the second presetting unit 60 may set input rules each corresponding to one of the front nasal finals (an, en, in, un, ün (also be vn)) according to the above-mentioned method. That is, it may be set that when the user presses the input button corresponding to the simple final of one front nasal final, the corresponding front nasal final is input. For example, the second presetting unit 60 may set that when the user presses the input button corresponding to the simple final "a" for a long time, the front nasal final "an" is output as the character input by the user, and when the user presses the input button corresponding to the simple final "e" for a long time, the front nasal final "en" is output as the character input by the user, and when the user presses the input button corresponding to the simple final "v" for a long time, the front nasal final "vn" is output as the character input by the user. For input rules each corresponding to one of the back nasal finals, the first presetting unit 10 and the second presetting unit 60 sets that one back nasal final is input through inputting "the simple final plus the back nasal". That is, when the user wants to input one back nasal final, the user firstly presses the input button corresponding to the simple final for a short time, and then presses the input button corresponding to the back nasal for a short time. For example, when the user wants to input the back nasal final "ang", the user firstly presses the input button corresponding to the simple final "a" for a short time, and then presses the input button corresponding to the back nasal for a short time, to finish the input of the back nasal final "ang".

After the terminal sets the mapping relationships between the operation positions of the input character platform and the character information by the first presetting unit 10, and sets the mapping relationships between the operation duration each corresponding to one of the operation positions of the character input platform and the character information by the second presetting unit 60, the pinyin letter or combination of pinyin letters corresponding to the real-timely obtained operation position and the operation duration of the user inputting a character through the character input platform may be determined by the determining unit 30 and the outputting unit 50, together with the mapping relationships. Specifically, when the user inputs a character through the character input keyboard (physical keyboard of character input or soft keyboard of character input), the terminal obtains the operation position of inputting a character through the character input platform by the built-in obtaining unit 20, that is, after the terminal obtains the tapping position of the user inputting a character, the determining unit 30 determines the input button corresponding to the operation position by the first processing unit 31, and determines the pinyin letter or combination of pinyin letters corresponding to the tapping position by the second processing unit 32, together with the mapping relationships between the operation positions of the character input platform and the character information. For example, if the first processing unit 31 determines that the tapping position is the first input button on the upper left corner of the input keyboard shown in Table 10 when the user inputs a character of a pinyin letter, the second processing unit 32 determines that the combination of pinyin letters corresponding to the input button is "an" according to the mapping relationship between the input button and the pinyin letter or combination of pinyin letters, that is, the pinyin letter "a" or the combination of pinyin letters "an" may be output. After that, the outputting unit 50 determines whether the pinyin letter or the combination of pinyin letters corresponds to the input button according to the operation duration of the user inputting a character through the input keyboard (that is by determining whether the duration of pressing the input button on the upper left corner of the input keyboard shown in Table 10 is T1 (e.g., a short press) or T2 (e.g., a long press, wherein T1 is less than T2)). If the duration of the user tapping on the input button obtained by the obtaining unit 10 is T1, the outputting unit 50 determines that the input character currently desired by the user is "a", that is, the pinyin letter "a" is selected as the character currently input through the character input platform. If the duration of the user tapping on the input button obtained by the obtaining unit 20 is T2, the outputting unit 50 determines that the input character currently desired by the user is "an", that is, the combination of pinyin letters "an" is selected as the character currently input through the character input platform.

As described above, according to the layout of the input keyboard and the input rules of the letters of Chinese pinyin set above, if the user still wants to input the Chinese character expressed in pinyin "zhang", the structure of the pinyin "zhang" is considered to be the structure consisted of "the initial plus the final", that is, consisted of "zh plus ang". According to the pinyin structure "zh plus ang" of the pinyin "zhang" and the input rules set above, when the user firstly presses the input button corresponding to the pinyin letter "z" of the input keyboard shown in Table 10 for a long time, the obtaining unit 20 of the terminal determines the input button corresponding to the pinyin letter "z" of the input keyboard which is pressed by the user for a long time, the determining unit 30 determines that the pinyin letter corresponding to the input button is "z", and the outputting unit 50 determines to output the initial "zh". Secondly, when the user presses the input button corresponding to the pinyin letter "a" of the input keyboard shown in Table 10 for a short time, the terminal obtains the simple final "a". Finally, when the user presses the input button corresponding to the back nasal of the input keyboard shown in Table 10 for a short time, the terminal obtains the back nasal final "ang" according to the simple final "a", thus the pinyin "zhang" is obtained. From the steps described above, it is known that there are only 3 steps to input the pinyin "zhang". Comparing with the quanpin input existed in the present technology, two steps are omitted, and the typing speed of pinyin input increases.

In this embodiment, the terminal may preset the mapping relationships between the operation positions of the character input platform and the character information and preset the mapping relationships between the operation durations each corresponding to one of the operation positions of the character input platform and the character information by the first presetting unit and the second presetting unit. That is, the terminal may preset pinyin letters or combinations of pinyin letters each corresponding to one input button of the input keyboard. The terminal may further obtain the operation position and operation duration of inputting a character through the character input platform (e.g., input keyboard) by the obtaining unit, and the determining unit may determine the pinyin letter or combination of pinyin letters corresponding to the operation position of inputting the character according to the operation position obtained by the obtaining unit. Finally, the outputting unit determines to select the corresponding pinyin letter or combination of pinyin letters as the character input through the character input platform according to the operation duration of inputting a character and output the selected character. The embodiment of the present invention may reduce steps of inputting Chinese pinyin when inputting Chinese characters, increasing the efficiency of inputting Chinese pinyin, and improving user's experience in using the terminal to input characters.

Figure 7:
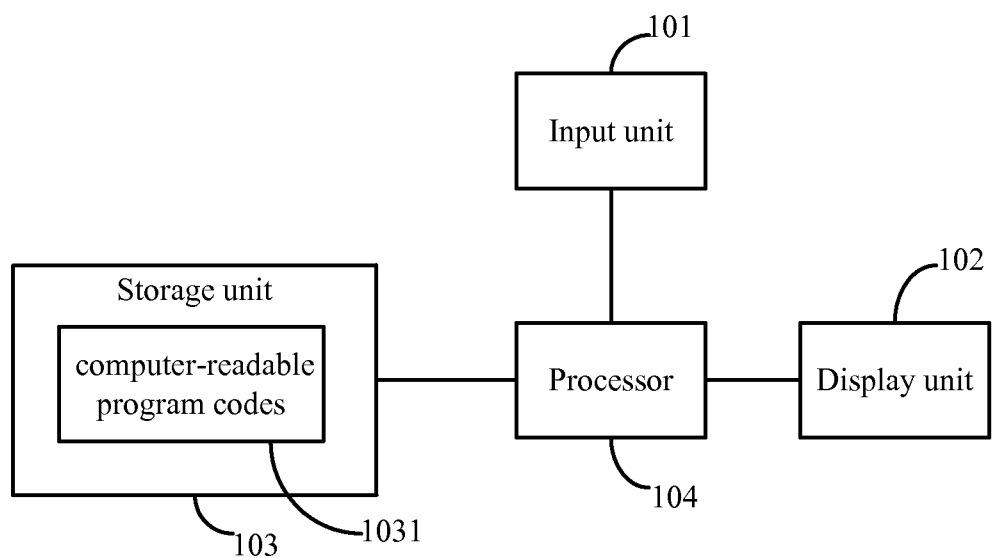
FIG. 7 is a schematic diagram of a terminal provided by an exemplary embodiment of the present invention.

Referring to FIG. 7, it is a schematic diagram of a terminal provided by an exemplary embodiment of present disclosure. The terminal can include but not limited to an input unit 101, a display unit 102, a storage unit 103, and a processor 104. The input unit 101, the display unit 102, and the storage unit 103 are electrically connected to the processor 104.

The input unit 101 is configured to input information to the terminal, such as letters for example. The input unit 101 may be but not limited to a physical keyboard, a touchscreen, or a combination of the physical keyboard and the touchscreen.

The display unit 102 is configured to display visual information, such as text, image, for example. The display unit 102 may be an LED display screen.

The storage unit 103 is configured to store a plurality of computer-readable program codes 1031. The storage unit 103 can be a read only memory (ROM), a random access memory (RAM), a U-disk, a removable hard disk, etc.

The processor 104 can include multiple cores for multi-thread or parallel processing. In this embodiment, the processor 104 is configured to execute the plurality of computer-readable program codes 1031 to obtain an operation position and an operation duration of inputting a character through a character input platform; determine a combination of pinyin letters corresponding to the operation position according to mapping relationships between operation positions of the character input platform and character information, and select a pinyin letter from the combination of pinyin letters corresponding to the operation position or selecting the combination of pinyin letters corresponding to the operation position as a character input through the character input platform according to mapping relationships between operation durations each corresponding to one of the operation positions of the character input platform and character information.

In this embodiment, the character input platform includes at least one of a physical keyboard of character input and a soft keyboard of character input.

In this embodiment, before the operation position and the operation duration of inputting the character through the character input platform is obtained, the processor 104 is further configured to execute the plurality of computer-readable program codes to set that the character input platform includes a plurality of input buttons used as the operation positions of inputting characters through the character input platform, and set combinations of pinyin letters each corresponding to one of the input buttons, to set the corresponding relationships between the operation positions of the character input platform and the character information, and set input durations each corresponding to one of the combinations of pinyin letters corresponding to one of the input buttons and set input durations each corresponding to one of the pinyin letters of one of the combination of pinyin letters, to set the mapping relationships between the operation durations each corresponding to one of the operation positions of the character input platform and the character information.

In this embodiment, the processor 104 is configured to execute the plurality of computer-readable program codes to determine the input button corresponding to the operation position according to the obtained operation position of inputting the character through the character input platform, and determine the combination of pinyin letters corresponding to the input button according to the preset corresponding relationships between the input buttons and the combinations of pinyin letters.

In this embodiment, the pinyin letters include at least one of 26 Latin letters of "a", "b", "c", "d", . . . , and "z". The combinations of pinyin letters include combinations each consisted of at least two letters of the 26 Latin letters of "a", "b", "c", "d", . . . , and "z". The input buttons include at least one of the input buttons each corresponding to one of the 26 Latin letters of "a", "b", "c", "d", . . . , and "z" and an input button corresponding to the back nasal.

The units or sub-units in all embodiments of the present invention can be realized by a universal integrated circuit, such as a CPU (central processing unit, CPU) for example, or by an ASIC (application specific integrated circuit, ASIC). Orders of steps in all embodiments of the present invention can be adjusted according to the actual need, and steps in all embodiments of the present invention can be combined and cut according to the actual need. Units of the terminals in all embodiments of the present invention can be combined, divided, and cut according to actual need.

One of ordinary skill in the art can understand that all or part of process can be accomplished by using a computer program to instruct related hardware. All the program can be stored in a computer-readable storage medium. When the program is executed, the process of the embodiments of the above-mentioned methods can be included. Wherein, the storage medium can be a magnetic disk, an optical disk, a ROM (Read-Only Memory, ROM), a RAM (Random Access Memory, RAM), or the like.

The embodiments described above are merely preferred ones of the present disclosure but are not limitations to the protection scope of the present disclosure, thus equivalent variations made according to the appended claims of the present invention still fall within the scope of the present invention.

What is claimed is:

1. An input method of Chinese pinyin, comprising:
   setting that a character input platform comprises a plurality of input buttons used as operation positions of inputting characters through the character input platform, and setting combinations of pinyin letters each corresponding to one of the input buttons, to set corresponding relationships between the operation positions of the character input platform and character information;
   setting input durations each corresponding to one pinyin letter of one of the combinations of pinyin letters, to set mapping relationships between input durations and the character information;
   obtaining an operation position and an input duration of inputting a character through the character input platform;
   determining a combination of pinyin letters corresponding to the operation position according to the mapping relationships between the operation positions of the character input platform and the character information; and
   selecting a pinyin letter from the combination of pinyin letters corresponding to the operation position as a character input through the character input platform according to the mapping relationships between the input durations and the character information and the input duration.

2. The method of claim 1, wherein the character input platform comprises at least one of a physical keyboard of character input and a soft keyboard of character input.

3. The method of claim 1, wherein the step of determining the combination of pinyin letters corresponding to the operation position according to the mapping relationships between the operation positions of the character input platform and the character information comprises:
   determining the input button corresponding to the operation position according to the obtained operation position of inputting the character through the character input platform; and
   determining the combination of pinyin letters corresponding to the input button according to preset corresponding relationships between the input buttons and the combinations of pinyin letters.

4. The method of claim 1, wherein the pinyin letters comprise at least one of 26 Latin letters of "a", "b", "c", "d", . . . , and "z"; the combination of pinyin letters comprises combinations each consisted of at least two letters of the 26 Latin letters of "a", "b", "c", "d", . . . , and "z"; the input buttons comprises at least one of the input buttons each corresponding to one of the 26 Latin letters of "a", "b", "c", "d", . . . , and "z" and an input button corresponding to the back nasal.

5. The method of claim 2, wherein the pinyin letters comprise at least one of 26 Latin letters of "a", "b", "c", "d", . . . , and "z"; the combinations of pinyin letters comprise combinations each consisted of at least two letters of the 26 Latin letters of "a", "b", "c", "d", . . . , and "z"; the input buttons comprise at least one of the input buttons each corresponding to one of the 26 Latin letters of "a", "b", "c", "d", . . . , and "z" and an input button corresponding to the back nasal.

6. The method of claim 3, wherein the pinyin letters comprise at least one of 26 Latin letters of "a", "b", "c", "d", . . . , and "z"; the combinations of pinyin letters comprise combinations each consisted of at least two letters of the 26 Latin letters of "a", "b", "c", "d", . . . , and "z"; the input buttons comprise at least one of the input buttons each corresponding to one of the 26 Latin letters of "a", "b", "c", "d", . . . , and "z" and an input button corresponding to the back nasal.

7. A device comprising:
   a storage unit storing a plurality of computer-readable program codes; and
   a processor electrically coupled to the storage unit and configured to execute the plurality of computer-readable program codes to:
   set that a character input platform comprises a plurality of input buttons used as operation positions of inputting characters through the character input platform, and set combinations of pinyin letters each corresponding to one of the input buttons, to set corresponding relationships between the operation positions of the character input platform and character information;

set input durations each corresponding to one pinyin letter of one of the combination of pinyin letters, to set mapping relationships between input durations and the character information;

obtain an operation position and an input duration of inputting a character through the character input platform;

determine a combination of pinyin letters corresponding to the operation position according to the mapping relationships between the operation positions of the character input platform and the character information; and select a pinyin letter from the combination of pinyin letters corresponding to the operation position as a character input through the character input platform according to the mapping relationships between the input durations and the character information and the input duration.

8. The device of claim 7, wherein the character input platform comprises at least one of a physical keyboard of character input and a soft keyboard of character input.

9. The device of claim 8, wherein the processor being configured to determine the combination of pinyin letters corresponding to the operation position according to the mapping relationships between the operation positions of the character input platform and the character information comprises:

determining the input button corresponding to the operation position according to the obtained operation position of inputting the character through the character input platform; and determining the combination of pinyin letters corresponding to the input button according to preset corresponding relationships between the input buttons and the combinations of pinyin letters.

10. The device of claim 7, wherein the pinyin letters comprise at least one of 26 Latin letters of "a", "b", "c", "d", . . . , and "z"; the combinations of pinyin letters comprise combinations each consisted of at least two letters of the 26 Latin letters of "a", "b", "c", "d", . . . , and "z"; the input buttons comprise at least one of the input buttons each corresponding to one of the 26 Latin letters of "a", "b", "c", "d", . . . , and "z" and an input button corresponding to the back nasal.

11. The device of claim 8, wherein the pinyin letters comprise at least one of 26 Latin letters of "a", "b", "c", "d", . . . , and "z"; the combinations of pinyin letters comprise combinations each consisted of at least two letters of the 26 Latin letters of "a", "b", "c", "d", . . . , and "z"; the input buttons comprise at least one of the input buttons each corresponding to one of the 26 Latin letters of "a", "b", "c", "d", . . . , and "z" and an input button corresponding to the back nasal.

12. A non-transitory computer-readable storage medium storing a set of computer-readable program codes, when the set of computer-readable program codes are run in a device, the device being configured to:

set that a character input platform comprises a plurality of input buttons used as operation positions of inputting characters through the character input platform, and set combinations of pinyin letters each corresponding to one of the input buttons, to set corresponding relationships between the operation positions of the character input platform and character information;

set input durations each corresponding to one pinyin letter of one of the combination of pinyin letters, to set mapping relationships between input durations and the character information;

obtain an operation position and an input duration of inputting a character through the character input platform;

determine a combination of pinyin letters corresponding to the operation position according to the mapping relationships between the operation positions of the character input platform and the character information; and select a pinyin letter from the combination of pinyin letters corresponding to the operation position as a character input through the character input platform according to the mapping relationships between the input durations and the character information.

13. The non-transitory computer-readable storage medium of claim 12, wherein the character input platform comprises at least one of a physical keyboard of character input and a soft keyboard of character input.

14. The non-transitory computer-readable storage medium of claim 12, wherein the device being configured to determine the combination of pinyin letters corresponding to the operation position according to the mapping relationships between the operation positions of the character input platform and the character information comprises:

determining the input button corresponding to the operation position according to the obtained operation position of inputting the character through the character input platform; and determining the combination of pinyin letters corresponding to the input button according to preset corresponding relationships between the input buttons and the combinations of pinyin letters.

15. The non-transitory computer-readable storage medium of claim 12, wherein the pinyin letters comprise at least one of 26 Latin letters of "a", "b", "c", "d", . . . , and "z"; the combination of pinyin letters comprises combinations each consisted of at least two letters of the 26 Latin letters of "a", "b", "c", "d", . . . , and "z"; the input buttons comprises at least one of the input buttons each corresponding to one of the 26 Latin letters of "a", "b", "c", "d", . . . , and "z" and an input button corresponding to the back nasal.

* * * * *